US010311507B2

(12) United States Patent
Stausholm et al.

(10) Patent No.: US 10,311,507 B2
(45) Date of Patent: Jun. 4, 2019

(54) RECONFIGURABLE USER INTERFACE FOR PRODUCT ANALYSIS

(71) Applicant: Accenture Global Solutions Limited, Dublin (IE)

(72) Inventors: Søren Stausholm, Birkerød (DK); Henrik X. Rasmussen, Gentofte (DK); Mathias Nyvold Pedersen, Copenhagen N (DK)

(73) Assignee: Accenture Global Solutions Limited, Dublin (IE)

( * ) Notice: Subject to any disclaimer, the term of this patent is extended or adjusted under 35 U.S.C. 154(b) by 382 days.

(21) Appl. No.: 15/212,900

(22) Filed: Jul. 18, 2016

(65) Prior Publication Data

US 2017/0206594 A1  Jul. 20, 2017

Related U.S. Application Data

(60) Provisional application No. 62/280,846, filed on Jan. 20, 2016.

(51) Int. Cl.
*G06Q 30/02* (2012.01)
*G06Q 30/06* (2012.01)
(Continued)

(52) U.S. Cl.
CPC ..... *G06Q 30/0641* (2013.01); *G06F 3/04842* (2013.01); *G06Q 30/0201* (2013.01);
(Continued)

(58) Field of Classification Search
None
See application file for complete search history.

(56) References Cited

U.S. PATENT DOCUMENTS 7,818,205 B2 * 10/2010 Clark .................. G06Q 30/02
   705/14.1
7,840,462 B2 * 11/2010 Hansen ............... G06Q 10/087
   705/35
(Continued)

FOREIGN PATENT DOCUMENTS

WO  WO 2001/099003  12/2001
WO  WO 2015/192106  12/2015

OTHER PUBLICATIONS

Agostino, D., et al., "Performance Measurement System to Quantify the Contribution of Social Media: New Requirements for Metrics and Methods,"Measuring Business Excellence, 20.2: pp. 38-51 (2016).*

(Continued)

*Primary Examiner* — Nicholas D Rosen
(74) *Attorney, Agent, or Firm* — Harrity & Harrity, LLP

(57) ABSTRACT

A device may include one or more processors. The one or more processors may obtain product information relating to one or more products. The product information may be obtained from a set of web sites on which the one or more products are offered. The one or more processors may normalize the product information to determine normalized product information. The one or more processors may determine one or more product metrics based on the normalized product information. The one or more processors may generate a user interface based on the one or more product metrics. The user interface may provide information relating to the one or more product metrics. The user interface may permit a user to interact with the information relating to the one or more product metrics. The one or more processors may provide the user interface for display.

20 Claims, 7 Drawing Sheets

(51) Int. Cl.
*G06F 3/048* (2013.01)
*G06F 3/0484* (2013.01)

(52) U.S. Cl.
CPC ..... *G06Q 30/0283* (2013.01); *G06Q 30/0601* (2013.01); *G06Q 30/0623* (2013.01)

(56) References Cited

U.S. PATENT DOCUMENTS

| | | | | |
|---|---|---|---|---|
| 8,050,976 B2* | 11/2011 | Staib | ............ | G06Q 20/201 |
| | | | | 705/14.23 |
| 8,244,564 B2* | 8/2012 | Selinger | ............ | G06Q 30/02 |
| | | | | 705/7.11 |
| 8,868,442 B1* | 10/2014 | Odom | ............ | G06Q 30/0201 |
| | | | | 705/26.1 |
| 9,037,698 B1* | 5/2015 | Nordstrom | ............ | G06F 11/301 |
| | | | | 709/224 |
| 9,418,347 B2* | 8/2016 | George | ............ | G06Q 30/02 |
| 9,922,327 B2* | 3/2018 | Johnson | ............ | G06Q 30/00 |
| 2002/0138342 A1* | 9/2002 | Clark | ............ | G06O 30/02 |
| | | | | 705/14.14 |
| 2006/0173767 A1* | 8/2006 | Hansen | ............ | G06Q 10/087 |
| | | | | 705/35 |
| 2007/0073591 A1 | 3/2007 | Perry et al. | | |
| 2007/0130090 A1* | 6/2007 | Staib | ............ | G06Q 20/201 |
| | | | | 705/400 |
| 2009/0063247 A1* | 3/2009 | Burgess | ............ | G06Q 30/02 |
| | | | | 705/7.34 |
| 2010/0250336 A1* | 9/2010 | Selinger | ............ | G06Q 30/02 |
| | | | | 705/26.7 |
| 2012/0239524 A1* | 9/2012 | Ouimet | ............ | G06Q 30/00 |
| | | | | 705/26.7 |
| 2013/0346845 A1* | 12/2013 | Naftulin | ............ | G06F 9/4443 |
| | | | | 715/222 |
| 2014/0122203 A1* | 5/2014 | Johnson | ............ | G06Q 30/00 |
| | | | | 705/14.23 |
| 2014/0178052 A1* | 6/2014 | Kim | ............ | H04N 21/4334 |
| | | | | 386/297 |
| 2015/0040048 A1* | 2/2015 | George | ............ | G06Q 30/02 |
| | | | | 715/769 |
| 2015/0186911 A1* | 7/2015 | Vierra | ............ | G06Q 30/0206 |
| | | | | 705/7.35 |
| 2015/0220942 A1 | 8/2015 | Dubberley | | |
| 2016/0042250 A1* | 2/2016 | Cordova-Diba | ............ | G06T 5/00 |
| | | | | 382/180 |
| 2016/0224683 A1* | 8/2016 | Hicks | ............ | G06F 17/30554 |

OTHER PUBLICATIONS

Extended European Search report corresponding to EP 17 15 1721.2, dated Apr. 12, 2017, 6 pages.
Tableau Software, "Tableau Online: SaaS Analytics for Everyone," http://www.tableau.com/products/cloud-bi, Feb. 11, 2016, 10 pages.

* cited by examiner

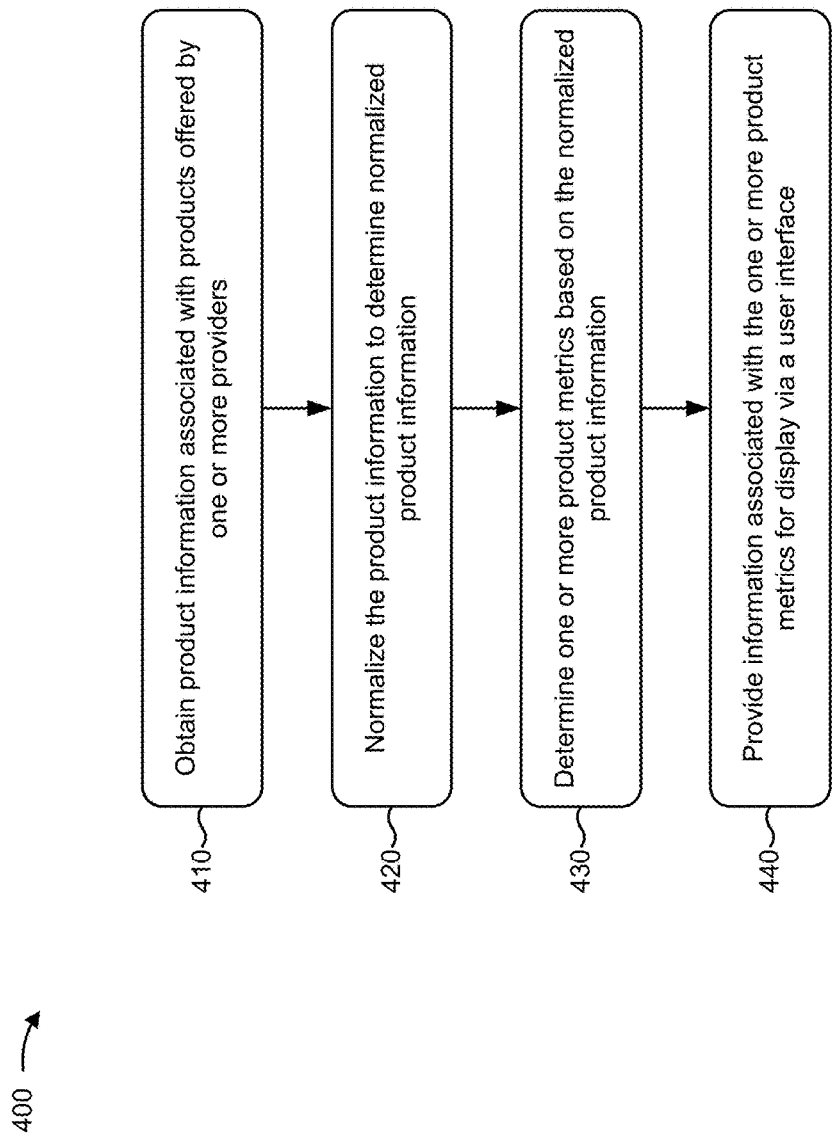

RECONFIGURABLE USER INTERFACE FOR PRODUCT ANALYSIS

RELATED APPLICATION

This application claims priority under 35 U.S.C. § 119 to U.S. Provisional Patent Application No. 62/280,846, filed on Jan. 20, 2016, the content of which is incorporated by reference herein in its entirety.

BACKGROUND

Electronic commerce, or e-commerce, may be characterized as the trading and/or facilitation of trading of products and/or services online using computer networks, such as the Internet. The products may be presented to a viewer or user on a website. Different web sites may have different formatting and/or may present information about the products in different ways.

SUMMARY

According to some possible implementations, a device may include one or more processors. The one or more processors may obtain product information relating to one or more products. The product information may be obtained from a set of websites on which the one or more products are offered. The one or more processors may normalize the product information to determine normalized product information. The one or more processors may determine one or more product metrics based on the normalized product information. The one or more processors may generate a user interface based on the one or more product metrics. The user interface may provide information relating to the one or more product metrics. The user interface may permit a user to interact with the information relating to the one or more product metrics. The one or more processors may provide the user interface for display.

According to some possible implementations, a non-transitory computer-readable medium may store one or more instructions that, when executed by one or more processors, may cause the one or more processors to obtain product information relating to one or more products. The product information may be obtained from a set of web sites on which the one or more products are offered or sold. The set of websites may be associated with different entities. The one or more instructions, when executed by one or more processors, may cause the one or more processors to normalize the product information to determine normalized product information. The one or more instructions, when executed by one or more processors, may cause the one or more processors to determine one or more product metrics based on the normalized product information. The one or more instructions, when executed by one or more processors, may cause the one or more processors to generate a user interface based on the one or more product metrics. The user interface may provide information relating to the one or more product metrics. The user interface may permit a user to interact with the information relating to the one or more product metrics. The one or more instructions, when executed by one or more processors, may cause the one or more processors to provide the user interface for display.

According to some possible implementations, a method may include obtaining, by one or more devices, product information relating to one or more products. The product information may be obtained from a set of websites on which the one or more products are offered or sold. The method may include normalizing, by the one or more devices, the product information to determine normalized product information. The method may include determining, by the one or more devices, one or more product metrics based on the normalized product information. The method may include generating, by the one or more devices, a user interface based on the one or more product metrics. The user interface may provide information relating to the one or more product metrics. The user interface may permit a user to interact with the information relating to the one or more product metrics. The method may include providing, by the one or more devices, the user interface for display.

BRIEF DESCRIPTION OF THE DRAWINGS

FIG. 4 is a flow chart of an example process for determining product metrics based on normalized product information and providing a user interface based on the product metrics.

DETAILED DESCRIPTION

Figure 1A:
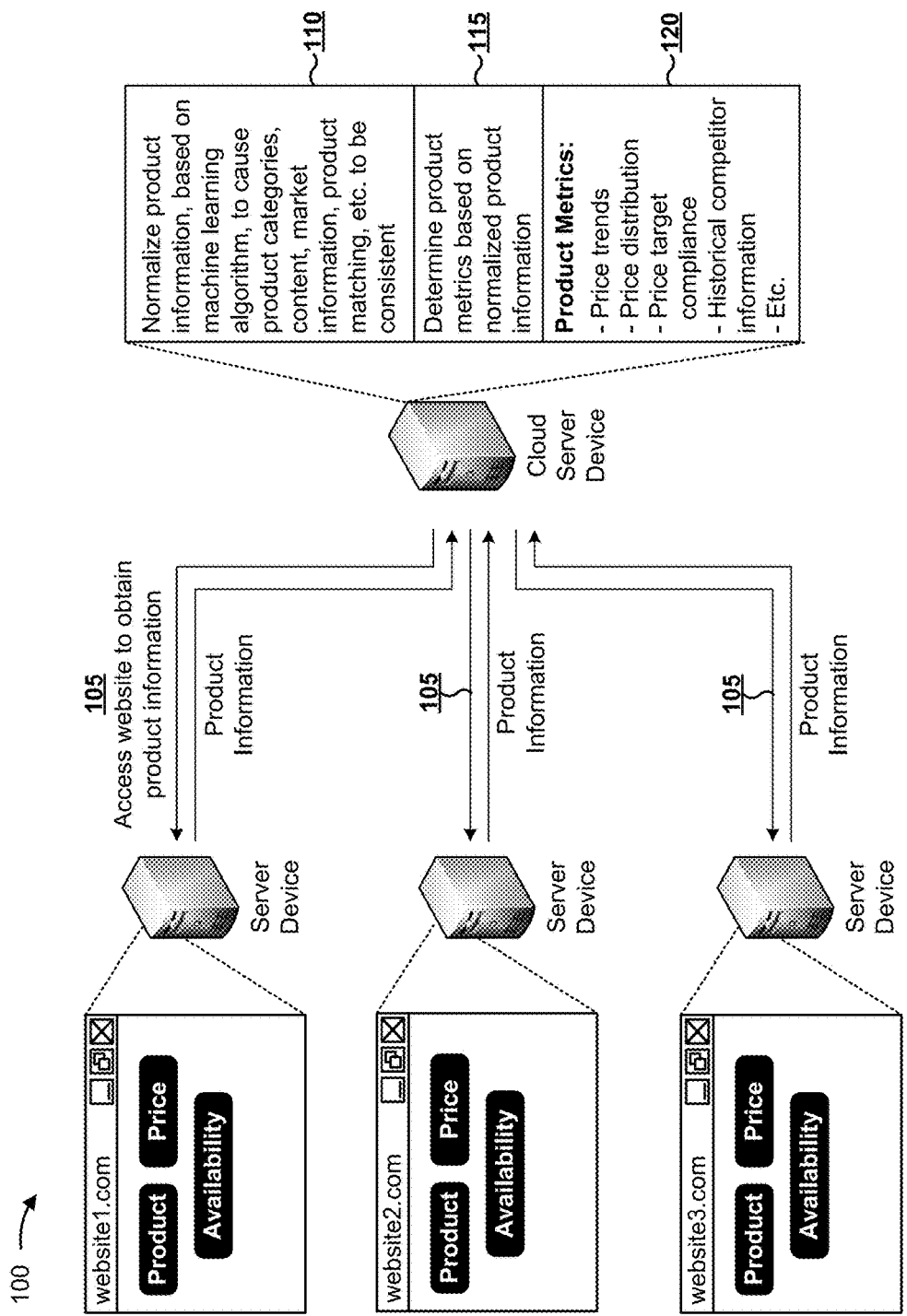
FIGS. 1A and 1B are diagrams of an overview of an example implementation described herein.

The following detailed description of example implementations refers to the accompanying drawings. The same reference numbers in different drawings may identify the same or similar elements.

Success of an entity may depend on activities of another entity. For example, the success of a consumer packaged goods (CPG) provider may depend on the activities of a retailer that sells products produced by the CPG provider and/or other products associated with other entities (e.g., products produced by competitors of the CPG provider). As such, it is important that the CPG provider have access to information associated with the activities of the retailer with respect to both the products of the CPG provider and the other products associated with other entities. For example, an entity associated with the CPG provider (e.g., a product manager, a brand manager, etc.) may wish to have access to information associated with products offered or sold by the retailer, prices of the products offered or sold by the retailer, product promotions run by the retailer, stock levels of the products offered or sold by the retailer, brand content presentation associated with the products (e.g., a manner in which brand content is provided and/or displayed to the consumer), or the like. Such information may be important to the CPG provider when, for example, the CPG provider negotiates with the retailer regarding selling products of the CPG company, monitors products sold by the retailer, engages in brand protection, engages in internal allocation of marketing and/or sales resources, or the like.

However, accessing and/or understanding information associated with the activities of the retailer, with respect to one or more products, may be difficult and/or time consuming for the CPG provider. For example, the retailer may not provide such information to the CPG provider and/or may not allow the CPG provider to access such information. Moreover, even when this information is accessible by the CPG provider, the information may not be regularly updated, which may lead to stale and/or outdated information being used by the CPG provider. Moreover, a retailer may sell through multiple types of channels (e.g., an online store, an online factory outlet store, a brick and mortar store, etc.) and this adds additional complexity to the CPG provider obtaining accurate information.

Additionally, the CPG provider may spend a significant amount of time and/or resources (e.g., man-hours) analyzing such information and, even then, may have difficulty gaining useful insights based on the information. For example, the CPG provider may have difficulty gaining useful insights such as an overview of a product category with respect to the CPG provider and a competitor, an overview of an online market associated with a product, or the like.

Implementations described herein may obtain and normalize product information associated with a product sold by one or more entities, and may determine one or more product metrics based on the normalized product information. Further, implementations described herein may provide, for display to a user, a user interface that includes information associated with the one or more product metrics. The information associated with the one or more product metrics may be formatted within the user interface to facilitate an entity to easily interpret the product metrics.

For example, the user interface may provide several important metrics (e.g., all of a set of most important metrics) for the entity (e.g., a CPG provider), which may reduce required user interaction to determine the several important metrics, improve decision-making based on the important metrics, and improve the user experience with the overview.

This may improve efficiency and/or efficacy of activities of a CPG provider by allowing the CPG provider to quickly and easily interpret information associated with one or more products. For example, the user interface may include information that allows the CPG provider to more efficiently and/or effectively monitor product distribution and/or product price points, prepare for negotiations with the one or more retailers, or the like. As another example, computing resources are conserved by reducing the number of interactions and the amount of time spent by the user in trying to find the information.

Furthermore, by using a cloud platform to obtain and normalize product information, and to determine and provide information relating to product metrics, implementations described herein reduce reliance on user input and reduce double-keying and double-storage of information (e.g., product information and/or product metrics).

Notably, while implementations described herein are described in the context of a CPG company/retailer domain, other implementations are possible. For example, these implementations may also be applied to a production process domain in order to improve efficiency of a production process by, for example, identifying a true per unit cost of materials, associated with the production process, when a given type of material may be obtained from multiple material vendors. This may allow the production process to operate more efficiently and/or at a lower cost.

Figure 1B:
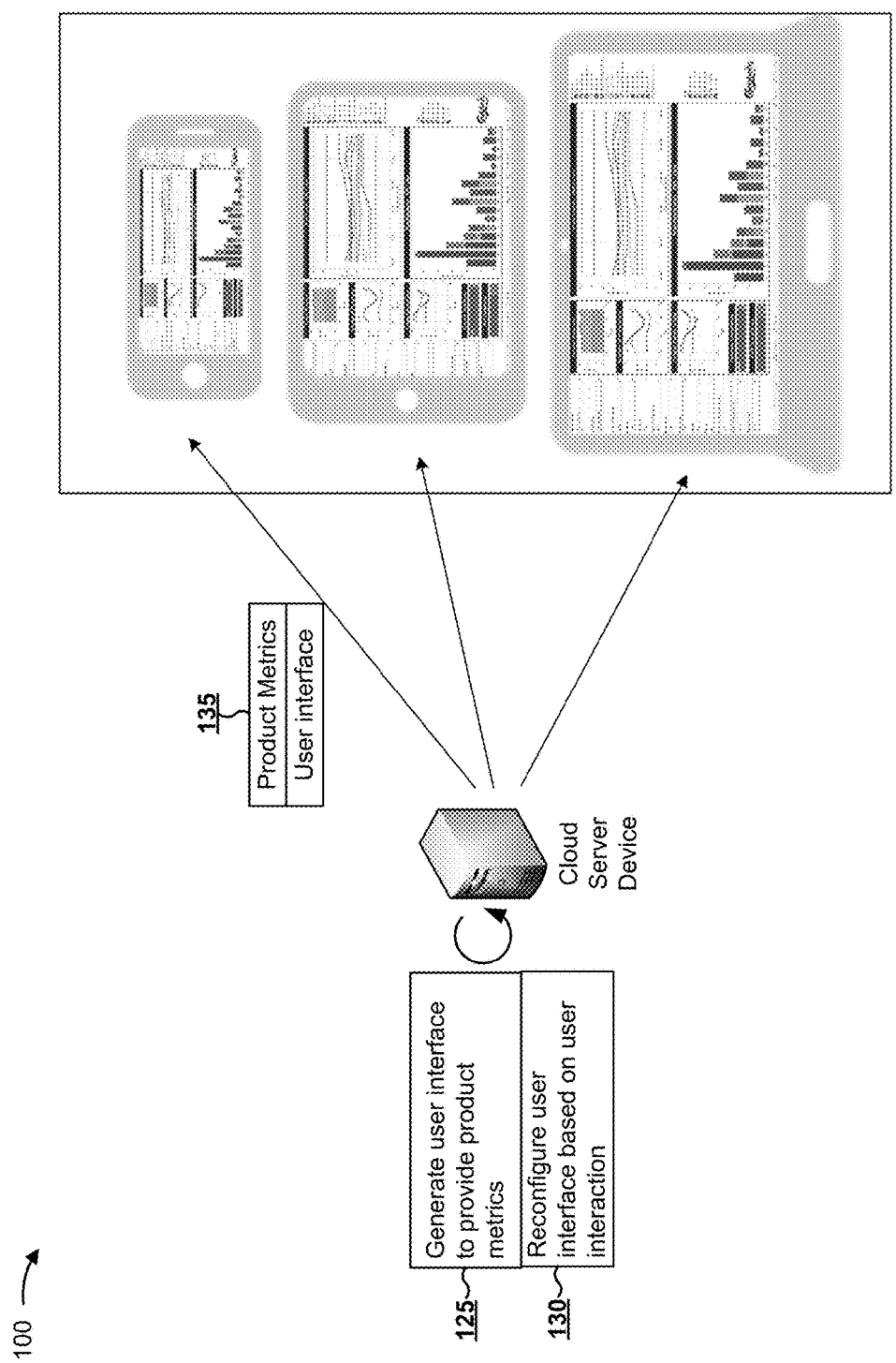

FIGS. 1A and 1B are diagrams of an overview of an example implementation 100 described herein. As shown in FIG. 1A, and by reference number 105, a cloud server device may access multiple, different web sites to obtain product information associated with products offered by one or more providers. As shown, the cloud server device may access a website1.com, a website2.com, and a website3.com to obtain product information associated with products offered by the websites. The websites, in some implementations, are operated by different entities, such as by different companies, by different subsidiaries of the same company, etc.

Figure 2:
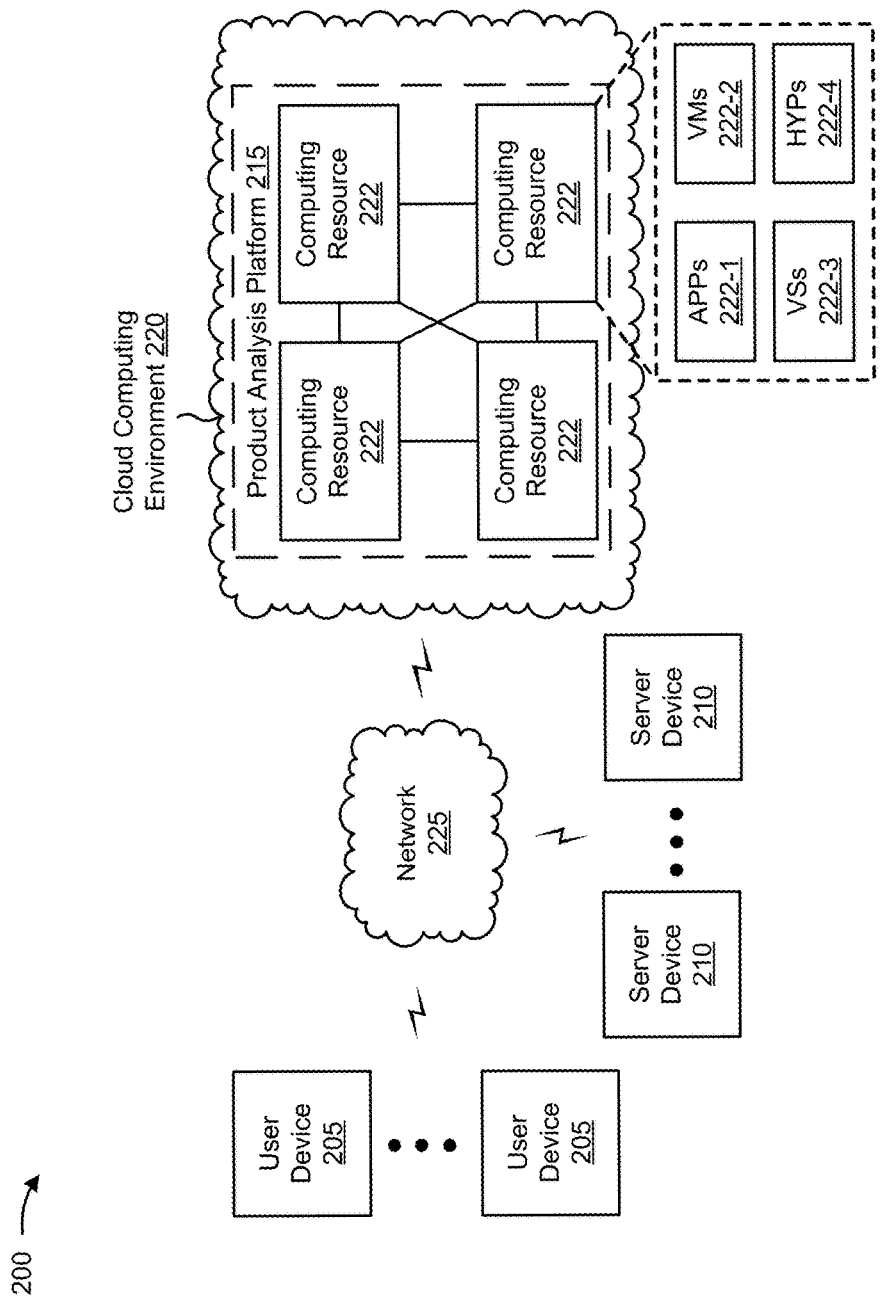
FIG. 2 is a diagram of an example environment in which systems and/or methods, described herein, may be implemented.

As shown by reference number 110, the cloud server device (e.g., a cloud server device of a product analysis platform, such as described with regard to FIG. 2) may normalize the product information obtained from the web sites to determine normalized product information. For example, the cloud server device may normalize the product information, based on a machine learning algorithm, to cause product identifiers, product pricing, product categories, content, market information, labeling, or the like, to be consistent. Additionally, or alternatively, the could server device may normalize the product information by performing a product matching process (e.g., by matching a product, when offered for sale on a first website, with the product when offered for sale on a second website).

As shown by reference number 115, the cloud server device may determine one or more product metrics based on the normalized product information. As shown by reference number 120, the one or more product metrics may include a price trend metric, a price distribution metric, a price target compliance metric, a historical competitor information metric, or the like, as described in more detail elsewhere herein.

As shown in FIG. 1B, and by reference number 125, the cloud server device may generate a user interface (e.g., a product dashboard) based on the one or more product metrics. As shown by reference number 130, the cloud server device may reconfigure the user interface based on detecting user interactions with the user interface. As shown by reference number 135, the cloud server device may provide the user interface to one or more user devices for display.

By obtaining product information associated with products offered by providers or retailers, normalizing the product information, determining a product metric based on the normalized product information, and providing information associated with the product metric for display via a user interface, implementations described herein may assist an entity associated with a CPG provider to easily and quickly interpret the information associated with the product metrics. Thus, efficiency and/or efficacy of activities of the entity may be improved. Furthermore, implementations described herein may reduce redundant entry and storage of product information, thus conserving processor and storage resources of the user devices and/or the cloud server device. Still further, implementations described herein may perform calculations based on the product information and may perform an action based on the calculations (e.g., may provide a notification to a retailer, may automatically reconfigure a price of a product, etc.).

As indicated above, FIGS. 1A and 1B are provided merely as an example. Other examples are possible and may differ from what was described with regard to FIGS. 1A and 1B.

FIG. 2 is a diagram of an example environment 200 in which systems and/or methods described herein may be implemented. As shown in FIG. 2, environment 200 may include one or more user devices 205, one or more server devices 210, a product analysis platform 215 hosted within a cloud computing environment 220, and a network 225. Devices of environment 200 may interconnect via wired connections, wireless connections, or a combination of wired and wireless connections.

User device 205 includes one or more devices capable of receiving, generating, storing, processing, and/or providing information associated with product analysis platform 215, such as information associated with a product dashboard (e.g., including information associated with one or more product metrics) provided by product analysis platform 215. For example, user device 205 may include a communication and computing device, such as a mobile phone (e.g., a smart phone, a radiotelephone, etc.), a laptop computer, a desktop computer, a tablet computer, a handheld computer, a wearable communication device (e.g., a smart wristwatch, a pair of smart eyeglasses, etc.), or a similar type of device.

Server device 210 includes one or more devices capable of receiving, storing, and/or providing product information for use by product analysis platform 215. For example, server device 210 may include a server or a group of servers. In some implementations, server device 210 may include a device that hosts a website associated with an entity that offers or sells one or more products. In some implementations, product analysis platform 215 may obtain product information, associated with the one or more products, from server device 210.

Product analysis platform 215 includes one or more devices capable of obtaining product information, normalizing the product information, determining one or more product metrics, and providing information associated with the one or more product metrics, as described elsewhere herein. For example, product analysis platform 215 may include a server or a group of servers. In some implementations, product analysis platform 215 may be designed to be modular such that certain software components can be swapped in or out depending on a particular need. For example, a normalizing module, associated with normalizing obtained product information, may be configured in a first manner (e.g., with a first set of rules) for normalizing product information associated with a first industry (e.g., a beverage industry), and may be configured in a second manner (e.g., with a second set of rules) for normalizing product information associated with a second industry (e.g., a sporting goods industry). The normalizing module may then be swapped in or out, as needed. As such, product analysis platform 215 may be adaptable and easily and/or quickly reconfigured for different uses.

In some implementations, as shown, product analysis platform 215 may be hosted in cloud computing environment 220. Notably, while implementations described herein describe product analysis platform 215 as being hosted in cloud computing environment 220, in some implementations, product analysis platform 215 may not be cloud-based (i.e., may be implemented outside of a cloud computing environment) or may be partially cloud-based.

Cloud computing environment 220 includes an environment that hosts product analysis platform 215. Cloud computing environment 220 may provide computation, software, data access, storage, etc. services that do not require end-user (e.g., user device 205) knowledge of a physical location and configuration of system(s) and/or device(s) that hosts product analysis platform 215. As shown, cloud computing environment 220 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host product analysis platform 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by user device 205. Application 222-1 may eliminate a need to install and execute the software applications on user device 205. For example, application 222-1 may include software associated with product analysis platform 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., user device 205), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 225 includes one or more wired and/or wireless networks. For example, network 225 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
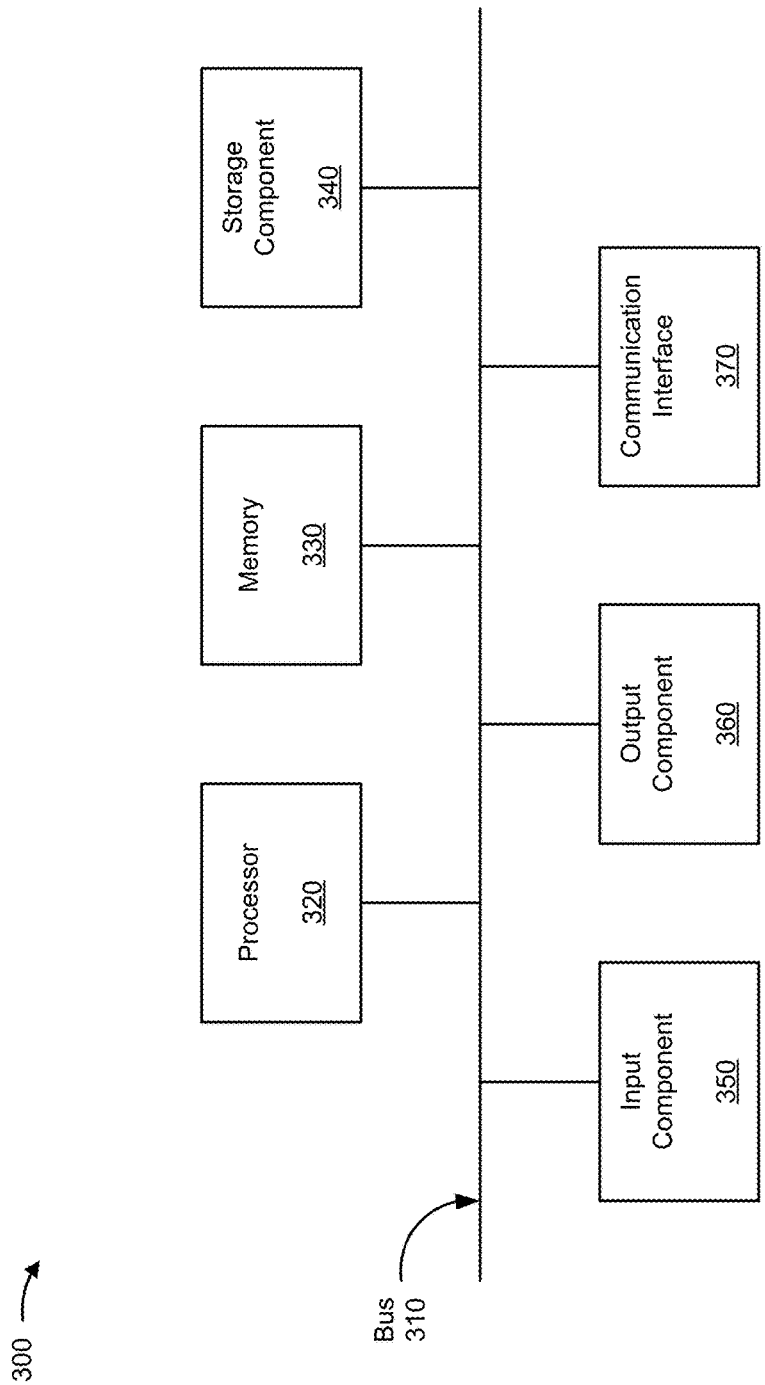
FIG. 3 is a diagram of example components of one or more devices of FIG. 2.

FIG. 3 is a diagram of example components of a device 300. Device 300 may correspond to user device 205 and/or server device 210. In some implementations, user device 205 and/or server device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining product metrics based on normalized product information and providing a user interface based on the product metrics. In some implementations, one or more process blocks of FIG. 4 may be performed by product analysis platform 215. In some implementations, one or more process blocks of FIG. 4 may be performed by another device or a group of devices separate from or including product analysis platform 215, such as user device 205 and/or server device 210.

As shown in FIG. 4, process 400 may include obtaining product information associated with products offered by one or more providers (block 410). For example, product analysis platform 215 may obtain product information associated with products offered by one or more providers. The products may be offered for sale, for rent, or the like. In some implementations, the one or more providers may be associated with a CPG provider, may be retailers that offer a CPG product for sale, or the like.

In some implementations, product analysis platform 215 may obtain the product information from multiple websites associated with a provider. For example, product analysis platform 215 may be configured with a software-implemented process or program (e.g., a robot) designed to scrape one or more web sites, associated with the provider, in order to obtain the product information. As described herein, scraping may refer to the process of extracting information from the one or more web sites (e.g., based on text recognition, optical character recognition, etc.). In some implementations, the process or program may obtain additional information associated with the web site (e.g., an image of a webpage on the website, a time at which the webpage was accessed, or the like). In some implementations, product analysis platform 215 may obtain the product information based on user input (e.g., based on crowdsourcing, based on inputs by a worker, etc.).

In some implementations, the websites may be associated with different entities and/or may have different domain names. Additionally, or alternatively, the websites may be unaffiliated with each other, may be associated with different geographic locations, may be associated with different retailers, or the like.

In some implementations, the product information may include information that identifies a product offered or sold by a provider (e.g., a name, a product identifier, such as a serial number, a model number, etc.). In some implementations, the product information may include information associated with or identifying a brand of a product, such as a name, a logo, a tagline, a typeface, or the like.

In some implementations, the product information may include information that identifies a category and/or subcategory of a product. The category may include, for example, a beauty and health category, a beverage category, an electronics category, a clothing and jewelry category, a food category, a home and garden category, a sports and outdoors category, a toys category, or the like. For example, if the product information indicates that a product is associated with a beverage category, the product information may identify a subcategory, associated with the product, of beer, soda, juice, water, or the like.

In some implementations, the product information may identify or relate to a price of a product. For example, the product information may identify a price of the product, a currency of the price of the product, or the like. In some implementations, the product information may identify a price per unit associated with the product. For example, the product information may include information that indicates whether the price measure is a price per liter, per gallon, per kilogram, or the like. As yet another example of product information relating to price, the product information may indicate whether a product price is a retail price, a wholesale price, or the like. As still another example of product information relating to price, the product information may include information that identifies a volume discount price for the product. For example, the product information may indicate whether a price of the product is based on a particular quantity being purchased or offered for sale.

In some implementations, the product information may include information that identifies promotional information associated with a product. For example, the product information may indicate that a product is associated with a buy-one-get-one free promotion, a half-price promotion, a package of multiple, different products, a group purchase discount, or the like.

In some implementations, the product information may include information that identifies a stock level associated with the product. For example, the product information may indicate an amount of the product in the provider's inventory, may indicate that the provider is out of stock of the product, or the like.

In some implementations, the product information may include information that identifies a location associated with the product. For example, the product information may include information that identifies a geographic location from which the product may be shipped by the provider, a geographical area in which the product is available, or the like.

In some implementations, the product information may include review information associated with the product. For example, the product information may include content of consumer reviews of the product on a provider website, an aggregate score of reviews associated with the product, an expert's review of the product, or the like.

In some implementations, the product information may include information that identifies a unit of measure associated with the product. For example, the product information may indicate that the product is offered for sale per unit, per kilogram, per case, or the like. In some implementations, the product information may include information that identifies a packaging type. For example, the product information may include information that indicates whether the product is packaged in bulk, in a resealable package, in shrink wrap, or the like.

In some implementations, the product information may include information relating to a trade segment and/or a channel. A provider may be associated with a particular trade segment or channel based on characteristics of a website or business associated with the provider (e.g., a size and/or format of a physical store associated with the website or business, a pricing scheme of the website or business, a type of products sold by the website or business, etc.). For the purpose of implementations described herein, "trade segment" and "channel" are used interchangeably.

As one example, a trade segment or channel may include an e-commerce trade segment. An e-commerce trade segment may correspond to providers that offer products of a particular type for sale online. Additionally, or alternatively, a trade segment or channel may include a hard discounter channel. For example, a hard discounter channel may offer products through stores that are engaged in the sale of grocery items and that have a stocking policy that focuses on a high private label share, low prices, a relatively limited number of stock keeping units (SKUs)), or the like.

Additionally, or alternatively, a trade segment or channel may include a hypermarket channel. For example, a hypermarket channel may offer products through retailers with floor areas greater than a particular threshold size (e.g., greater than approximately 2,500 square meters, greater than approximately 5,000 square meters, etc.) that may carry full lines of groceries, general merchandise, or the like.

Additionally, or alternatively, a trade segment or channel may include a supermarket channel. For example, a supermarket channel may offer products through retailers with floor areas of a particular range of sizes (e.g., approximately 300 square meters to 2,500 square meters, or a different range) that offer a wide, departmentalized range of groceries, that may carry some general merchandise lines, or the like.

The examples of product information, given above, are just that—examples. These examples of product information may be used individually or in combination. Other examples of product information are possible, and implementations described herein are not intended to be limited to the above examples of product information.

In some implementations, product analysis platform 215 may obtain product information associated with a subscriber, which may be any entity that may subscribe to the services provided by product analysis platform 215 (e.g., determination of product metrics, generation of a user interface or product dashboard, etc.). For example, product analysis platform 215 may obtain product information associated with products offered by the subscriber (e.g., from a website associated with the subscriber, from a database associated with the subscriber, based on a user input received from the subscriber, or the like).

In some implementations, product analysis platform 215 may automatically (e.g., without user intervention) obtain the product information. For example, an automated process or entity (e.g., a robot, a web scraping tool, etc.) may automatically obtain information from the one or more websites. Additionally, or alternatively, product analysis platform 215 may periodically (e.g., every 24 hours, every seven days, etc.) obtain the product information. Additionally, or alternatively, product analysis platform 215 may obtain the product information based on a user input and/or based on information provided by a device associated with the provider website, such as a server device that hosts the provider's website. Additionally, or alternatively, product analysis platform 215 may obtain product information based on receiving an interaction with a user interface, such as the product dashboard, as described in more detail elsewhere herein.

As further shown in FIG. 4, process 400 may include normalizing the product information to determine normalized product information (block 420). For example, product analysis platform 215 may normalize the product information to determine normalized product information. In some implementations, product analysis platform 215 may apply an automated data normalization process to the product information in order to normalize the product information such that the product information is in a format that is usable for further processing by product analysis platform 215. Because the product information may be obtained from different sources (e.g., different web sites, different providers, etc.), the product information may be formatted, labeled, and/or arranged differently. Product analysis platform 215 may normalize the product information to ensure that the formatting, labeling, and/or arrangement of the product information is usable for further processing by product analysis platform 215.

As an example, a particular product may be named and/or categorized differently across multiple provider websites. In some implementations, product analysis platform 215 may process this product information such that the product is named and/or categorized consistently. As another example, a particular unit of measure may be used differently across multiple provider websites. For example, a first website may identify a size of a product in terms of liters, and a second web site may identify a size of a product in terms of quarts. Product analysis platform 215 may normalize this product information such that the units of measure are consistent.

In some implementations, product analysis platform 215 may normalize the product information based on a set of rules stored or accessible by product analysis platform 215. Each rule, of the set of rules, may be applied to the product information. Based on applying the set of rules, product analysis platform 215 may normalize (e.g., harmonize, make consistent) the product information such that items of normalized product information may be used for further processing. As an example, after application of the set of rules, normalized product information for a product that is offered via a first website and via a second web site may be consistent such that a product name, a brand name associated with the product, a pack size associated with the product, or the like, are consistently defined across the normalized product information.

As another example, one or more rules may correspond to a product category. For example, product analysis platform 215 may identify a product category associated with product information, and may apply one or more rules, associated with the product category, to normalize the product information. Thus, computing resources are conserved by properly normalizing the product information the first time.

In some implementations, normalizing the product information may include filtering the product information (e.g., to remove unwanted product information). For example, product analysis platform 215 may filter the product information based on user instructions specifying product information to filter. As another example, product analysis platform 215 may automatically filter the product information based on a past interaction with the product information. For instance, if a user has previously interacted with first product information more than with second product information via a user interface, product analysis platform 215 may filter the product information to remove the second product information. By automatically filtering the product information, product analysis platform 215 saves processor/storage resources that would otherwise be used to process and store a greater quantity of product information.

As yet another example, product analysis platform 215 may filter product information based on a product category. For example, product analysis platform 215 may determine whether product information is associated with a first product category or a second product category. When the product information is associated with the first product category, product analysis platform 215 may filter first information. When the product information is associated with the second product category, product analysis platform 215 may filter second information. In this way, processor resources are conserved that would otherwise be used to process unfiltered product information.

In some implementations, product analysis platform 215 may normalize the product information based on a machine learning process and/or a model. For example, product analysis platform 215 may train a model based on a machine learning process to generate normalized product information (e.g., based on a training set of un-normalized product information and normalized product information corresponding to the un-normalized product information). By training the model, product analysis platform 215 improves accuracy of the normalization process, which conserves computing resources used in the normalization process.

Product analysis platform 215 may update the model based on feedback associated with the normalized product information and/or based on additional normalized product information (e.g., as part of another training set). In some implementations, product analysis platform 215 may receive feedback based on a user interaction with the normalized product information. For example, a user may specify whether normalized product information is accurate, and the machine learning process may be updated based on whether the normalized product information is accurate. Using the machine learning process and/or model in this way may improve the accuracy of normalized product information, thereby reducing wasted time and processor resources relating to inaccurate normalized product information.

Normalizing the product information as described herein also may reduce an amount of resources (e.g., processing resources, memory resources, etc.) needed to store and/or analyze the product information. As such, product analysis platform 215 may more efficiently determine product metrics based on the normalized product information than when using product information that has not been normalized.

As further shown in FIG. 4, process 400 may include determining one or more product metrics based on the normalized product information (block 430). For example, product analysis platform 215 may determine one or more product metrics based on the normalized product information. A product metric may include one or more values that are determined based on comparing normalized product information from two or more retailers, two or more webpages, two or more time intervals, or the like. In some implementations, the product metric may include information that may be important (e.g., useful, relevant, or the like) to a particular type of entity (e.g., a CPG company) and/or for a particular product category.

In some implementations, product analysis platform 215 may select one or more product metrics to be determined based on configuration information identifying the one or more product metrics, based on a past user interaction, or the like. For example, when product analysis platform 215 determines that a user has previously interacted with particular product metrics via a user interface, product analysis platform 215 may select the particular product metrics to be determined and provided via the user interface. As another example, product analysis platform 215 may select the particular product metrics based on a product category associated with the one or more products. In this way, product analysis platform 215 conserves processor resources that would otherwise be used to determine undesired or irrelevant product metrics.

In some implementations, a product metric may be a pricing metric. For example, the pricing metric may include a price measurement metric, such as a price per unit, a price per liter, a price per offer, or the like. In some implementations, a product metric may be a price trend metric. For example, the price trend metric may identify an average price per day, a change in a price over a time period, or the like. In some implementations, a product metric may be a price distribution metric. For example, the price distribution metric may identify a price distribution across trade segments or channels (e.g., by comparing a product price associated with a supermarket trade segment to a product price associated with a hard discounter trade segment).

In some implementations, a product metric may be a compliance metric. A compliance metric may indicate whether product information satisfies a rule or threshold. For example, the compliance metric may include a minimum advertised pricing (MAP) compliance metric, a brand compliance metric (e.g., relating to a name of a product, presentation of a product, etc.), a stock compliance metric (e.g., relating to a quantity of product offered for sale), or the like.

The examples of product metrics, given above, are just that—examples. These examples of product metrics may be used individually or in combination. Other examples of product metrics are possible, and implementations described herein are not intended to be limited to the above examples of product metrics.

In some implementations, product analysis platform 215 may determine the product metric based on applying one or more algorithms to the normalized product information. For example, product analysis platform 215 may determine a price per unit product metric by determining an average price of a product (e.g., across multiple provider websites and/or providers) based on the normalized product information, and by dividing the average price by a unit of measure (e.g., liter, kilogram, or the like), associated with the product, identified in the normalized product information.

In some implementations, product analysis platform 215 may determine a product metric using a machine learning process and/or a model. For example, product analysis platform 215 may train a model based on a machine learning process to generate product metrics (e.g., based on a training set of normalized product information and product metrics corresponding to the normalized product information). By training the model, product analysis platform 215 improves accuracy of the product metrics. Additionally, or alternatively, product analysis platform 215 may identify product metrics to be generated based on the model. For example, based on user interactions and/or requests relating to particular product metrics, product analysis platform 215 may train the model to determine the particular product metrics. Thus, product analysis platform 215 conserves processor resources that would otherwise be used to determine unwanted product metrics.

In some implementations, product analysis platform 215 may update the model (e.g., based on feedback associated with the determined product metric, based on another training set, etc.) such that the model may learn and become more accurate over time. In some implementations, product analysis platform 215 may receive feedback from a user, and may update the model based on the feedback. For example, product analysis platform 215 may receive feedback on the product metrics, to be used to update the model implemented by product analysis platform 215. The feedback may include information indicating user interactions with particular product metrics, information indicating which product metrics are correct, information indicating one or more other product metrics requested by a client, or the like.

As another example, an entity associated with product analysis platform 215 may determine whether the product metrics are correct and may provide feedback to improve calculation of the product metrics. By determining the product metrics using the machine learning process and/or model, product analysis platform 215 may conserve processor resources that would otherwise be used to calculate inaccurate or irrelevant product metrics.

In some implementations, product analysis platform 215 may combine two or more product metrics to determine a combined metric (e.g., based on a weighted combination, based on an unweighted combination, etc.). In such a case, product analysis platform 215 may determine weights to be applied to the two or more product metrics based on past user interactions with one or more product metrics.

In some implementations, product analysis platform 215 may generate a score for a particular product metric, and may provide information for display via a user interface based on the score. For example, the score may indicate whether the particular product metric is likely to be important to a user, is likely to be associated with a user interaction, or the like. When product analysis platform 215 provide the one or more product metrics for display, product analysis platform 215 may provide additional information based on the score (e.g., color coding, highlighting, etc.) to draw attention of a user to the particular product metric. Thus, product analysis platform 215 conserves computing resources that would otherwise be used to provide the user interface to a user for a greater length of time than when attention of the user is drawn to the particular product metric.

As further shown in FIG. 4, process 400 may include providing information associated with the one or more product metrics for display via a user interface (block 440). For example, product analysis platform 215 may provide information associated with one or more product metrics for display via a user interface. In some implementations, the user interface may include a product dashboard in which information associated with one or more product metrics can be provided for display. For example, the user interface may include one or more graphical and/or tabular representations (e.g., graphs, charts, reports, or the like), associated with one or more product metrics corresponding to one or more products and/or product categories.

In some implementations, product analysis platform 215 may select a user interface template, of a set of user interface templates, based on which to generate a user interface. For example, the information provided for display via the user interface (e.g., a set of product metrics), the layout of the product dashboard, and/or the design of the product dashboard may be based on a user interface template, which may be selected based on a domain associated with the user and/or a product category associated with the one or more products. As another example, for a user in the CPG domain, product analysis platform 215 may generate a user interface based on a user interface template to include information associated with a particular set of product metrics associated with the CPG industry. The particular set of product metrics may include, for example, information that identifies a product, a brand associated with a product, promotional information associated with a product, or the like.

Additionally, or alternatively, the user interface template may be selected based on information associated with a particular product, such as a product category. For example, the user interface may provide information associated with a first set of product metrics for a product of a first product category, and may provide information associated with a second set of product metrics for a product of a second product category. Thus, computing resources are conserved based on filtering the information to be provided to a user and based on providing useful information to the user, which reduces an amount of time the user spends to analyze the information.

In some implementations, product analysis platform 215 may store or have access to information that identifies sets of product metrics to be displayed for a particular domain, a particular product category, or the like. Product analysis platform 215 may receive or determine information identifying the particular domain, the particular product category, or the like. For example, product analysis platform 215 may identify the particular domain or product category based on the product information associated with a product, based on user input that identifies the particular domain or product category, based on information associating particular products with the particular dome or product category, based on subscriber information associated with a subscriber to which the user interface is to be provided, or the like.

In other words, product analysis platform 215 may configure the user interface according to, for example, a particular industry, a product category, a type of sales channel, or the like. In some implementations, the user interface may provide a user (e.g., a product manager, a brand manager, etc.) with an integrated view of information needed to support making business decisions. For example, the user interface may include a chart showing a set of price trend metrics for a set of products. The chart may show the price trend metrics for a particular date range, and may show the price trend metrics in relation to each other. Using the price trend metrics shown in this way on a single display or interface, a brand manager, for example, may easily compare the price trend metrics. The brand manager may then use the comparison of price trend metrics in negotiations with providers, when making decisions regarding building value into a brand, or the like.

In some implementations, product analysis platform 215 may provide a product metric or other information for display based on user input. For example, a user (e.g., a product manager, a brand manager, etc.) may select (e.g., via one or more input elements of the user interface) one or more filters corresponding to one or more product metrics that the user wishes to view. In such a case, product analysis platform 215 may provide the one or more product metrics, and/or information relating to the one or more product metrics, for display based on the user input. Additionally, or alternatively, product analysis platform 215 may detect an interaction with a portion of the user interface corresponding to a particular product metric, and may determine and/or provide an additional product metric and/or one or more modified product metrics based on detecting the interaction. Additionally, or alternatively, product analysis platform 215 may detect an interaction with a portion of the user interface corresponding to a particular product metric, and may obtain and/or provide additional product information based on detecting the interaction.

In some implementations, product analysis platform 215 may receive, via the user interface, an interaction with a product metric and/or information associated with a product metric (e.g., by selecting a line on a line graph, a slice of a pie chart, etc.). In such a case, product analysis platform 215 may provide, for display, additional information associated with the selected product metric. For example, product analysis platform 215 may provide the normalized product information corresponding to the product metric. Here, the user may further interact with the normalized product information, and product analysis platform 215 may provide additional information associated with the normalized product information, such as an image of a particular website from which the normalized product information originated, a more precise value of the normalized product information, or the like. In some implementations, product analysis platform 215 may provide timing information associated with the selected normalized product information, such as a date and/or a time at which the product information was obtained. In some implementations, product analysis platform 215 may provide links to websites from which product information is obtained, to permit a user to access the websites.

In some implementations, product analysis platform 215 may provide access to the user interface using a subscription-based model (e.g., the user may periodically pay a fee for access to the user interface and/or the one or more product metrics). This may allow for simplified access to the user interface. For example, the user may not need to be concerned with other fees associated with accessing and/or determining the product metric, such as software licenses to the robot, database and visualization costs, hosting and storage cost, maintenance of application programming interfaces (APIs), integrations, software updates, security, or the like.

In some implementations, product analysis platform 215 may cause one or more actions to be automatically (e.g., without user intervention) performed based on the determined product metric. For example, if product analysis platform 215 determines that a stock compliance metric satisfies a threshold (e.g., when a quantity of product inventory is less than a particular amount), then product analysis platform 215 may cause a product shipment to be automatically initiated (e.g., by automatically creating and providing a product shipment order). Thus, computing resources are conserved that would otherwise be used to generate and send the product shipment order (e.g., manually, based on manual input, etc.).

As another example, if product analysis platform 215 determines that a compliance metric (e.g., a brand compliance metric, a MAP compliance metric, etc.) satisfies a threshold (e.g., is less than or more than a particular amount), product analysis platform 215 may cause a message to be automatically provided, a meeting to be automatically scheduled (e.g., on a calendar of a product manager), or the like. Thus, computing resources are conserved that would otherwise be used to generate the message and/or schedule a meeting (e.g., manually, based on manual input, etc.).

As yet another example, if product analysis platform 215 determines that a price measurement metric satisfies a threshold (e.g., is higher or lower than a threshold amount), then product analysis platform 215 may cause a message (e.g., a text message, an email, an audio message, etc.) to be automatically provided to one or more providers (e.g., including a request to raise or lower the price of the product). Thus, computing resources are conserved that would otherwise be used to generate and send the message (e.g., manually, based on manual input, etc.).

As still another example, if product analysis platform 215 determines that a first price measurement metric, associated with a product of the CPG provider, is greater than a second price measurement metric, associated with a product of a competitor of the CPG provider, then product analysis platform 215 may cause a message to be automatically provided to one or more providers (e.g., including a request to lower the price of the product), may cause a price increase to occur with regard to the product of the CPG provider, may cause the product of the CPG provider to no longer be offered for sale, may cause an advertisement to be distributed that relates to the product of the CPG provider, or the like. Thus, computing resources are conserved that would otherwise be used to perform such actions based on manual input.

In this way, product analysis platform 215 may obtain and normalize product information associated with a product offered by one or more entities. Product analysis platform 215 may determine one or more product metrics based on normalized product information, and may provide a user interface that provides information (e.g., graphs, charts, metrics, reports, etc.) associated with the one or more product metrics. The user interface may allow an entity to easily interpret the information associated with the product metrics, which may improve efficiency and/or efficacy of activities of the entity by allowing the entity to quickly and easily interpret information associated with one or more products.

Further, by automatically normalizing product information, product analysis platform 215 may save processor and/or storage resources that would otherwise be used to process and store a greater quantity of product information. By using feedback to refine the normalized product information, product analysis platform 215 may improve accuracy of normalized product information, thereby reducing wasted time and processor resources relating to inaccurate or unnecessary normalized product information. By determining whether product metrics are correct, and providing feedback to improve calculation of product metrics, product analysis platform 215 may conserve processor resources that would otherwise be used to calculate inaccurate or unnecessary product metrics.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
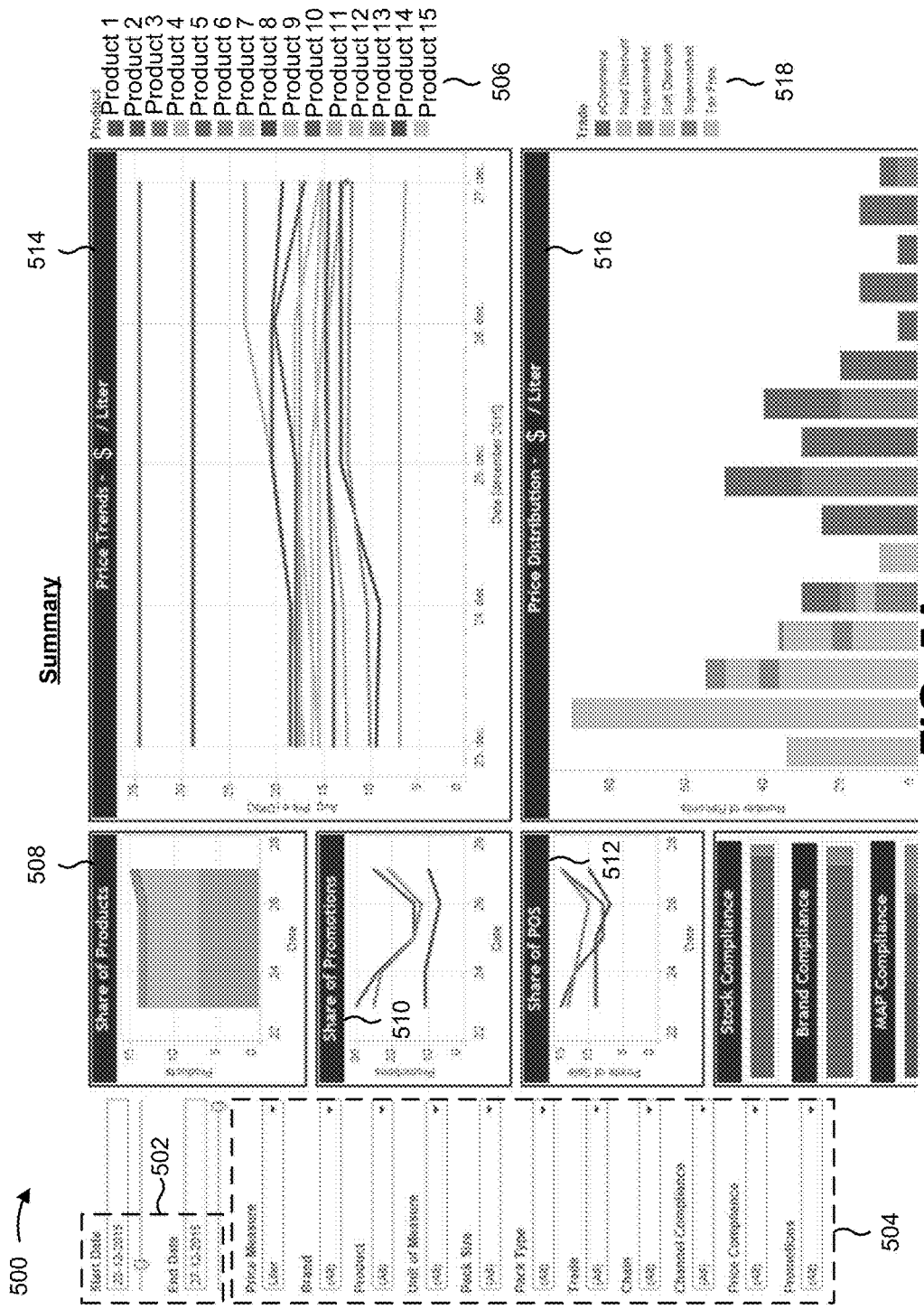
FIGS. 5A and 5B are diagrams of an example implementation relating to the example process shown in FIG. 4.
Figure 5B:
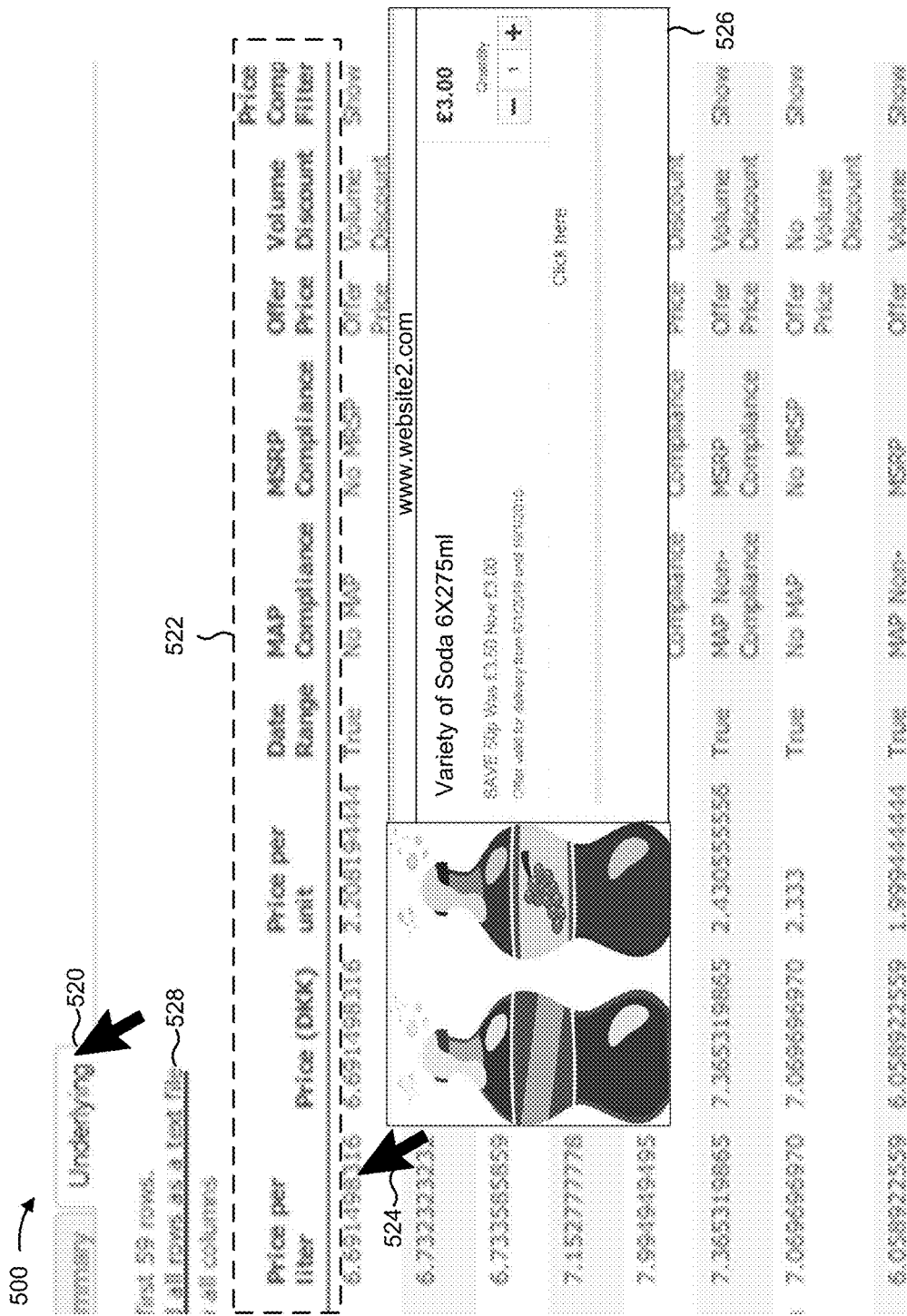

FIGS. 5A and 5B are diagrams of an example implementation 500 relating to example process 400 shown in FIG. 4. FIGS. 5A and 5B show an example of a user interface, such as a product dashboard. Product analysis platform 215 may generate the user interface based on normalized product information and/or based on one or more product metrics determined based on the normalized product information, as described in more detail elsewhere herein. Here, FIG. 5A shows a summary view of the user interface, and FIG. 5B shows a view of the user interface that provides product information and/or product metrics in a tabular form.

As shown in FIG. 5A, and by reference number 502, the user interface may permit a user to specify a start date and/or an end date for product metrics to be provided for display via the user interface. Here, the start date includes a value of 22-12-2015, and the end date includes a value of 27-12-2015. These dates may be used to filter the product information such that only product information for the selected dates may be provided. This conserves computing resources by reducing the amount of product information that is presented for display.

As shown by reference number 504, the user interface may include one or more input elements associated with product information and/or product metrics. The input elements may permit a user to select one or more filters in order to configure the user interface. The filters may be used to filter the product information (e.g., to identify unwanted product information that is not to be provided for display) and/or to identify one or more product metrics that the user wishes to view. This conserves computing resources by reducing the amount of product information that is presented for display. As shown, the filters may include a price measure filter, a brand filter, a product filter, a unit of measure filter, a pack size filter, a pack type filter, a trade segment filter, a chain filter, a channel compliance filter, a price compliance filter, and a promotions filter.

As shown by reference number 506, the user interface may include product input elements corresponding to products (e.g., product 1 through product 15). A user may select one or more products using the product input elements. Based on the product input elements, product analysis platform 215 may filter product information (e.g., to remove unwanted product information associated with products that are not selected) and may identify one or more product metrics associated with selected products. Product analysis platform 215 may provide product information associated with the selected products, and may filter product information associated with the unselected products. This conserves computing resources by reducing the amount of product information that is presented for display. In some implementations, the product input elements may be associated with respective colors, patterns, or the like, that may identify product information and/or product metrics associated with the product input elements.

As shown by reference number 508, the user interface may provide information relating to a share of products product metric. The share of products product metric may identify a number of unique products offered in a market per brand per day. The share of products product metric may be generated based on a user selecting the appropriate input elements shown by reference number 504 and/or selecting a date range, as shown by reference number 502.

As shown by reference number 510, the user interface may provide information relating to a share of promotions product metric. The share of promotions product metric may identify a quantity of promotions offered in a particular market with regard to a particular product in a particular period of time.

In some implementations, different product metrics may be associated with different presentation styles or graphical representations. For example, the "share of products" product metric shown by reference number 508 may be represented using an area graph, and the "share of promotions" product metric shown by reference number 510 may be represented using a line graph. In some implementations, a presentation style or graphical representation may be specified by a user. In some implementations, product analysis platform 215 may determine a presentation style or graphical representation to use for a particular product metric (e.g., based on formatting of the particular product metric, based on a presentation style or graphical representation used for a similar product metric, based on a user interface template, etc.), which conserves computing resources that would otherwise be used to obtain information identifying the presentation style or graphical representation from a user.

As shown by reference number 512, the user interface may provide information relating to a share of point of sale (POS) product metric. In some implementations, the share of POS product metric may identify a quantity of different chains (e.g., groups, brands, etc.) of stores that offer a given product in a particular time period. As shown by reference number 512, the share of POS product metric may be represented by a line graph.

As shown by reference number 514, the user interface may provide information relating to a price trends product metric. In some implementations, the price trends product metric may identify an average price per product in a particular time period, and may identify a currency associated with the average price (e.g., U.S. Dollars). As further shown by reference number 514, the price trends product metric may be represented by a line graph.

As shown by reference number 516, the user interface may provide information relating to a price distribution product metric. In some implementations, the price distribution product metric may identify a quantity of products offered for sale in one or more trade segments, and may identify particular price intervals associated with the quantity of products. As further shown by reference number 516, the price distribution product metric may be represented by a bar graph.

As shown by reference number 518, the user interface may include a legend that identifies types of trade segments or channels, including, for example, an e-commerce channel, a hard discount channel, a hypermarket channel, a soft discount channel, a supermarket channel, and/or a tax free channel. The legend may correspond to the "price distribution" product metric identified by reference number 516.

As shown in FIG. 5B, and by reference number 520, user device 205 may detect an interaction with a particular input element of the user interface to cause user device 205 to provide, for display, product metrics in a tabular format. This conserves computing resources that would otherwise be used to manually obtain or determine values of the product metrics. In some implementations, the particular input element may include a tab, a button, or the like. The other product metrics are shown in FIG. 5B, and are described with regard to reference numbers 522 through 526.

As shown by reference number 522, product analysis platform 215 may provide the product metrics for display in tabular format. For example, reference number 522 shows a table that includes a price per liter product metric column, a price in Danish krones (price DKK) product metric column, a price per unit product metric column, a date range product metric column, a minimum advertised price (MAP) compliance product metric column, a manufacturer's suggested retail price (MSRP) compliance product metric column, an offer price product metric column, a volume discount product metric column, and a price compliance filter product metric column.

As shown by reference number 524, user device 205 may detect an interaction with particular product information or a particular product metric, and may provide, for display, additional and/or different information based on the interaction. As shown by reference number 526, user device 205 may provide, for display, a screenshot of the website from which the product information was obtained, when the product information was obtained.

As shown by reference number 528, the user interface may include an element to cause product analysis platform 215 to export the normalized product information and/or the one or more product metrics. Based on detecting an interaction with the element, product analysis platform 215 and/or user device 205 may provide the normalized product information and/or the one or more product metrics (e.g., in a textual format, in a tabular format, etc.).

As indicated above, FIGS. 5A and 5B are provided merely as an example. Other examples are possible and may differ from what was described with regard to FIGS. 5A and 5B.

By automatically normalizing product information, product analysis platform 215 may save processor/storage resources that would otherwise be used to process and store a greater quantity of product information. By using feedback based on a user interaction to improve normalization of the product information, product analysis platform 215 may improve accuracy of normalized product information, thereby reducing wasted time and processor resources relating to inaccurate normalized product information. By determining whether product metrics are correct, and providing feedback to improve calculation of product metrics, product analysis platform 215 may conserve processor resources that would otherwise be used to calculate inaccurate product metrics.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

While implementations described herein are described in relation to obtaining product information from multiple, different websites, implementations described herein can also be applied with regard to a single website (e.g., a single webpage or multiple, different webpages of a particular web site).

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
obtain product information relating to one or more products,
the product information being obtained from a plurality of websites on which the one or more products are offered;
normalize the product information to determine normalized product information;
determine one or more product metrics based on the normalized product information;
generate a user interface based on the one or more product metrics,
the user interface to provide information relating to the one or more product metrics, and
the user interface to permit a user to interact with the information relating to the one or more product metrics;
provide the user interface for display;
detect an interaction with the user interface,
the interaction identifying particular normalized product information, of the normalized product information, to be provided for display;
modify the one or more product metrics, based on the particular normalized product information, to generate one or more modified product metrics; and
provide, for display via the user interface, information relating to the one or more modified product metrics.

2. The device of claim 1, where the one or more processors are further to:
detect an additional interaction with the user interface;
determine an additional product metric based on the normalized product information and based on the additional interaction; and
provide, for display via the user interface, information relating to the additional product metric.

3. The device of claim 1, where the one or more processors are further to:
detect a user interaction with a portion of the user interface that corresponds to a particular product of the one or more products;
obtain additional product information relating to the particular product; and
provide the additional product information for display.

4. The device of claim 1, where the one or more processors are further to:
detect an additional interaction with a portion of the user interface that pertains to a particular product of the one or more products; and
provide, for display, information that identifies a particular website, of the plurality of websites, from which product information relating to the particular product was obtained.

5. The device of claim 1, where the one or more processors, when obtaining the product information, are to:
obtain first product information from a first website of the plurality of websites,
the first product information being associated with a first format; and
obtain second product information from a second website of the plurality of websites,
the second product information being associated with a second format that is different from the first format, and
the second website being associated with a different entity than the first website; and
where the one or more processors, when normalizing the product information, are further to:
normalize the product information based on causing the first format to match the second format.

6. The device of claim 1, where the one or more processors, when determining the one or more product metrics, are to:
determine the one or more product metrics with regard to a particular product of the one or more products,
the one or more product metrics being determined based on comparing normalized product information from a first website of the plurality of websites and normalized product information from a second website of the plurality of websites,
the normalized product information from the first website and the normalized product information from the second website relating to the particular product.

7. The device of claim 1, where the one or more processors, when determining the one or more product metrics, are to:
select the one or more product metrics from a plurality of product metrics,
the one or more product metrics being selected based on the one or more product metrics being associated with a user interaction that occurred prior to selecting the one or more product metrics.

8. The device of claim 1, wherein the one or more processors are further to:
generate a score for a particular product metric,
the score indicating a measure of likelihood that the particular product metric will be associated with a user interaction; and
provide additional information based on the score,
the additional information causing the user interface to display color coding or highlighting associated with the particular product metric.

9. A non-transitory computer-readable medium storing instructions, the instructions comprising:
one or more instructions that, when executed by one or more processors, cause the one or more processors to:

obtain product information relating to one or more products,
  the product information being obtained from a plurality of websites on which the one or more products are offered or sold,
  the plurality of websites being associated with different entities;
normalize the product information to determine normalized product information;
determine one or more product metrics based on the normalized product information;
generate a user interface based on the one or more product metrics,
  the user interface to provide information relating to the one or more product metrics, and
  the user interface to permit a user to interact with the information relating to the one or more product metrics;
provide the user interface for display;
detect an interaction with the user interface,
  the interaction identifying particular normalized product information, of the normalized product information, to be provided for display;
modify the one or more product metrics, based on the particular normalized product information, to generate one or more modified product metrics; and
provide, for display via the user interface, information relating to the one or more modified product metrics.

10. The non-transitory computer-readable medium of claim 9, where the one or more instructions, when executed by the one or more processors, cause the one or more processors to:
determine that a particular product metric, of the one or more product metrics, satisfies a threshold; and
provide information indicating that the particular product metric satisfies the threshold.

11. The non-transitory computer-readable medium of claim 9, where the one or more instructions, when executed by the one or more processors, cause the one or more processors to:
determine a product category associated with the one or more products; and
where the one or more instructions, that cause the one or more processors to generate the user interface, cause the one or more processors to:
configure the user interface based on the product category,
  the user interface to provide the information related to the one or more product metrics based on the one or more products being associated with the product category.

12. The non-transitory computer-readable medium of claim 11, where the one or more instructions, when executed by the one or more processors, cause the one or more processors to:
determine that the one or more products are associated with the product category based on the product information associated with the one or more products.

13. The non-transitory computer-readable medium of claim 9, where the one or more instructions, that cause the one or more processors to provide the user interface, cause the one or more processors to:
provide a graphical representation of the information relating to the one or more product metrics; and
where the one or more instructions, when executed by the one or more processors, cause the one or more processors to:
detect an interaction with the graphical representation; and
provide, for display via the user interface, one or more values associated with the one or more product metrics.

14. The non-transitory computer-readable medium of claim 9, where the one or more products include a first product and a second product; and
where the one or more instructions, that cause the one or more processors to determine the one or more product metrics, cause the one or more processors to:
determine a particular product metric, of the one or more product metrics, based on comparing normalized product information corresponding to the first product and normalized product information corresponding to the second product.

15. The non-transitory computer-readable medium of claim 9, where the one or more instructions, that cause the one or more processors to obtain the product information, cause the one or more processors to:
obtain the product information from the plurality of websites based on automatically accessing the plurality of websites to obtain the information.

16. A method, comprising:
obtaining, by one or more devices, product information relating to one or more products,
  the product information being obtained from a plurality of websites on which the one or more products are offered or sold;
normalizing, by the one or more devices, the product information to determine normalized product information;
determining, by the one or more devices, one or more product metrics based on the normalized product information;
generating, by the one or more devices, a user interface based on the one or more product metrics,
  the user interface to provide information relating to the one or more product metrics, and
  the user interface to permit a user to interact with the information relating to the one or more product metrics;
providing, by the one or more devices, the user interface for display;
detecting, by the one or more devices, an interaction with the user interface,
  the interaction identifying particular normalized product information, of the normalized product information, to be provided for display;
modifying, by the one or more devices, the one or more product metrics based on the particular normalized product information to generate one or more modified product metrics; and
providing, by the one or more devices and for display via the user interface, information relating to the one or more modified product metrics.

17. The method of claim 16, further comprising:
detecting an additional interaction with the user interface,
  the additional interaction relating to a particular product metric of the one or more product metrics; and
providing additional information relating to the particular product metric based on the additional interaction.

18. The method of claim 17, where the particular product metric is determined based on normalized product information that is obtained from a particular website of the plurality of websites; and where providing the additional information further comprises:
provide information identifying the particular website,
the information identifying the particular website including an image of the particular website,
the image being obtained when the normalized product information was obtained.

19. The method of claim 16, further comprising:
selecting the one or more product metrics to be determined,
the one or more product metrics being selected based on information identifying an entity to which the user interface is to be provided.

20. The method of claim 16, where providing the user interface comprises:
providing a graphical representation of the information associated with the one or more product metrics; and
where the method further comprises:
detecting an interaction with the graphical representation; and
providing, for display via the user interface, one or more values associated with the one or more product metrics.

\* \* \* \* \*